Sept. 30, 1952 H. H. BOUSCHOR 2,612,196
HACK SAW
Filed March 4, 1948 2 SHEETS—SHEET 1
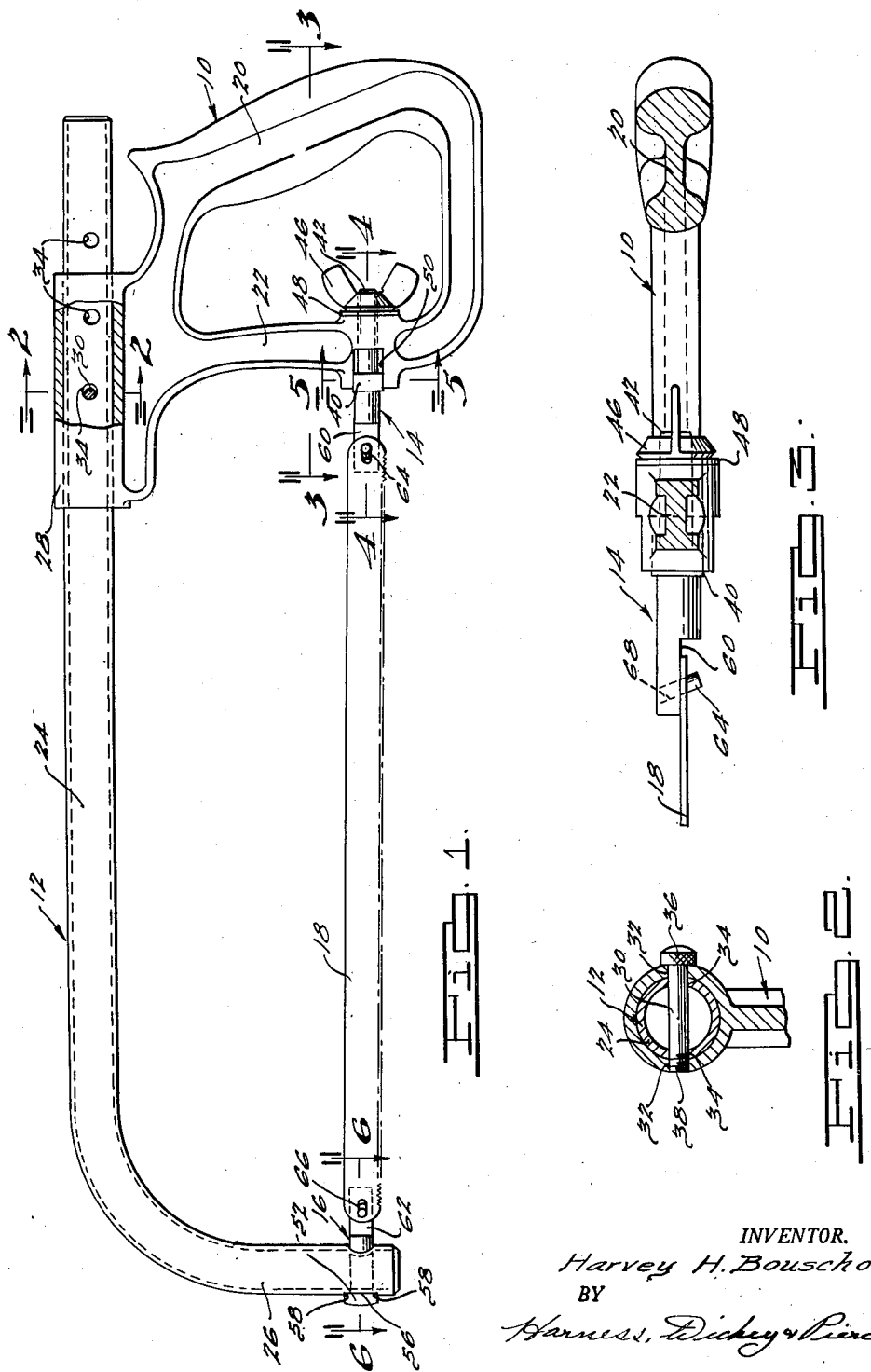
INVENTOR.
Harvey H. Bouschor.
BY
Harness, Dickey & Pierce.
ATTORNEYS.

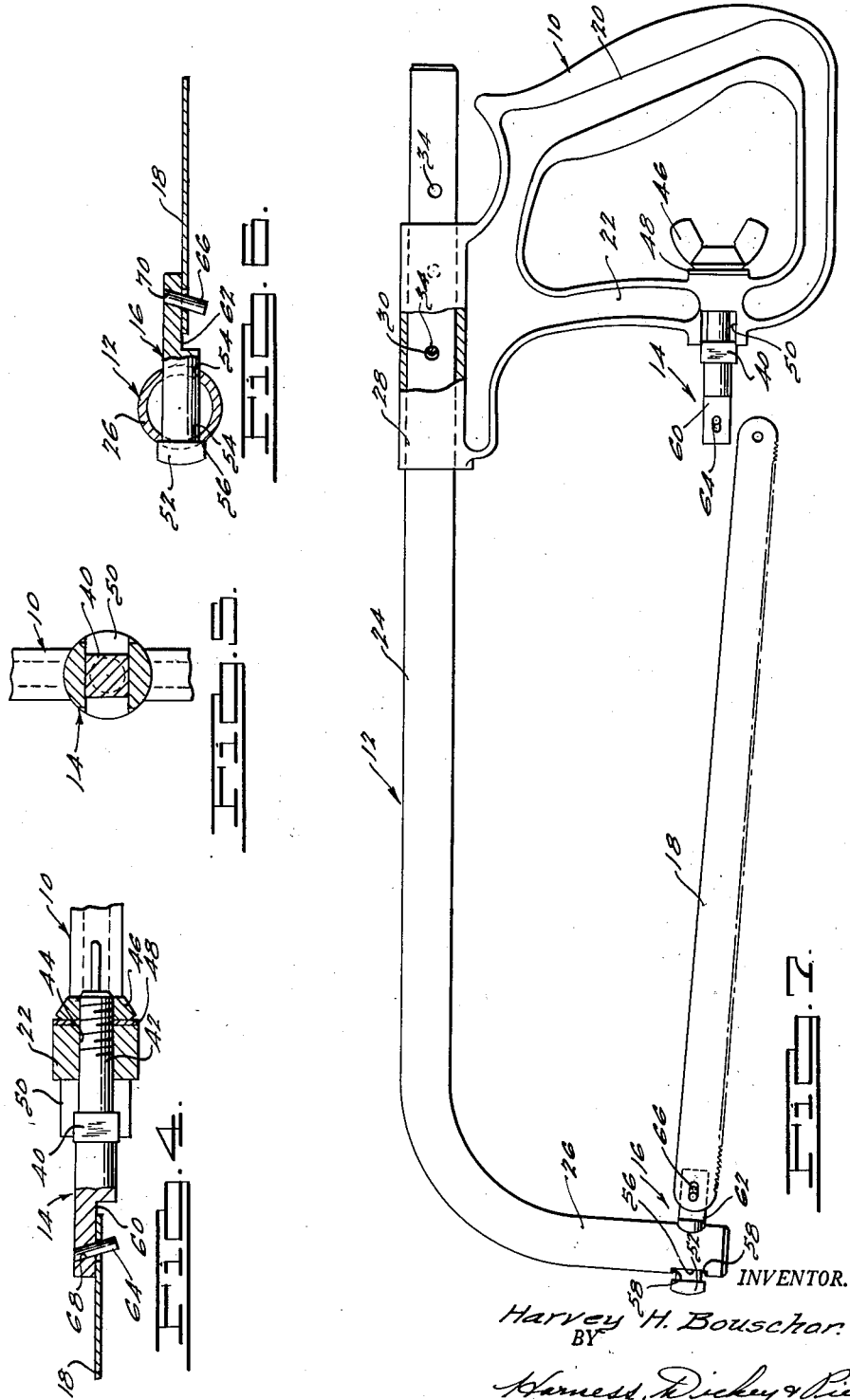

Patented Sept. 30, 1952

2,612,196

UNITED STATES PATENT OFFICE 2,612,196

HACK SAW

Harvey H. Bouschor, Detroit, Mich.

Application March 4, 1948, Serial No. 13,002

2 Claims. (Cl. 145—34)

This invention relates broadly to new and useful improvements in hack saws.

An important object of the present invention is to provide a hack saw in which the blade is held bowstring taut at all times.

Another object of the invention is to provide a hack saw in which the blade is mounted in such manner as to prevent the same from twisting about its longitudinal axis during use or operation of the saw.

Still another object of the invention is to provide a hack saw in which the blade is mounted precisely on the longitudinal axis of the supporting frame whereby to provide a balanced unit and to facilitate and expedite operation of the saw.

Yet another object of the invention is to provide a hack saw having a supporting frame which is absolutely rigid so as to hold the blade positioned properly at all times.

A further object of the invention is to provide a hack-saw frame of the above-mentioned character which is adjustable to accommodate conventional sizes of saw blades.

A still further object of the invention is to provide a hack saw having a handle which is uniquely shaped and correlated with the frame to impose thrust against the saw blade in a proper and efficient manner.

Other objects and advantages of the invention will be apparent in the course of the following description.

In the drawing forming a part of this specification and wherein like numerals are employed to designate like parts of the same:

Fig. 1 is a side-elevational view of a hack saw embodying the invention, parts thereof being broken away and shown in section for clearness of illustration;

Fig. 2 is a fragmentary, transverse sectional view taken along the line 2—2 of Fig. 1;

Fig. 3 is a fragmentary, longitudinal sectional view taken along the line 3—3 of Fig. 1;

Fig. 4 is a fragmentary, horizontal sectional view taken on the line 4—4 of Fig. 1;

Fig. 5 is a fragmentary, transverse sectional view taken on the line 5—5 of Fig. 1;

Fig. 6 is a fragmentary, longitudinal sectional view taken on the line 6—6 of Fig. 1; and Fig. 7 is a view similar to Fig. 1 but showing the rearward end of the saw blade disengaged from the frame.

In the drawing, wherein for the purpose of illustration is shown a preferred embodiment of the invention, the numeral 10 designates a cast-metal handle, and the numeral 12 designates a tubular metal frame which is carried by the handle. Separate fastening elements 14 and 16 are provided on the handle 10 and frame 12 respectively, and these elements are adapted for detachable engagement with opposite ends of a saw blade 18. Means hereinafter described in detail is provided for moving the element 14 relative to the element 16 to tighten the blade 18.

The present invention is concerned with the particular shape of the handle 10, with the manner in which the frame 12 is formed and associated with the handle 10 to provide a strong rigid structure for the saw blade 18, with the particular manner in which the elements 14 and 16 are associated with the handle and frame to prevent the saw blade from buckling or twisting in use, and in the construction of the particular means for fastening the saw blade to the elements 14 and 16.

The handle 10 here shown by way of illustration is generally rectangular in form, and the rearward portion 20 thereof is shaped to provide a handgrip. The portion 20 may have any suitable shape which fits the hand comfortably, and it will be observed that the blade-supporting element 14 is carried by the forward portion 22 of the handle so that it in no way interferes with grasping of the handgrip or use of the saw. Rigidity is an important consideration in so far as the handle 10 is concerned, and any construction which provides this characteristic is suitable for the present invention. I have found that a one-piece, sand-cast, metal handle having generally the shape shown in the drawing is pre-eminently satisfactory.

The frame 12 preferably is made of cold-drawn, welded tubing and comprises a relatively long, essentially straight main body portion 24 and an angularly disposed terminal portion 26. The body portion 24 extends through and snugly fits a barrel portion 28 which is formed integrally on the upper portion of the handle 10. The terminal portion 26 is disposed remote from the handle 10 and is arranged generally at right angles to the body portion 24 and substantially in parallel relation to the forward portion 22 of the handle. Also, it will be observed that the terminal portion 26 carries the blade fastening element 16, and the two elements 14 and 16 are arranged generally in alignment with each other.

In order to accommodate different conventional sizes of saw blades, the main body portion 24 of the frame 12 is longitudinally adjustable in the barrel 28; and in order to hold the frame in each of its selected adjusting positions, a locking pin 30 is inserted through transversely aligned openings 32 in the barrel 28 and transversely aligned registering openings 34 in the frame. As shown in Fig. 1 the frame 12 is provided with a plurality of equispaced, transverse holes 34, and it will be readily apparent that, if the locking pin 30 is removed, any of these openings can be selectively moved into register with the openings 32 by sliding the frame axially in the barrel 28. Preferably, the pin 30 is provided at one end with a knurled head 36 to facilitate manual handling thereof. The other end of pin 30 is threaded as at 38, and the opening 32 adapted to receive this end of the pin is internally threaded to engage the external threads of the pin. This arrangement holds the pin 38 securely in place and prevents it from inadvertently falling out of the holes 32 and 34.

It is significant that the locking pin 30 extends horizontally through the barrel 28 and frame 24 as this arrangement absolutely fixes the frame to the handle when the saw blade 18 is tightened and prevents the frame from rotating or oscillating in the barrel 28. When the blade 18 is tightened, force is applied longitudinally along the body 24 rearwardly in the direction of the handle 10, and this force tends to move the body 24 axially in the barrel 28. However, rearward movement of the frame is prevented by the locking pin 30. As a consequence, the openings 34 seat solidly against the pin 30. In effect, the openings 34 function in the same manner as V blocks to position the frame 12 angularly in the barrel and thereafter to prevent wobbling or oscillation of the frame in the barrel 28.

For ease in adjustment, the holes 34 are made large enough to permit ready insertion or removal of the pin 30. Thus some clearance is provided behind the locking pin 30 when the blade 18 is tightened, and this clearance is shown to an exaggerated extent in Fig. 1 of the drawing. In a device of this nature it is exceedingly important to maintain a frame rigid at all times and to prevent it from wobbling even slightly in the handle 10. At the same time, it is desirable to make the frame easily adjustable to accommodate different sizes of saw blades. If the frame flexes even slightly in use or if it moves independently in any direction relative to the handle 10, the saw blade 15 will twist or warp in use. If this occurs, the blade will not cut properly and will be easily broken. However, if both the frame and the handle are absolutely rigid and the frame is associated with the handle in such manner that the two elements cannot move independently of each other, the difficulties referred to above are obviated.

The blade fastening element 14 is generally in the form of an elongated pin having an integral, substantially square portion 40 intermediate its ends. The rearward portion 42 of the pin extends through a hole 44 provided in the forward portion 22 of the handle 10, and a wing nut 46 is screwed on the projecting terminal portion thereof. Preferably, a washer 48 is provided between the handle portion 22 and the wing nut 46.

A slot or a way 50 is provided in the leading edge of the handle portion 22, and the opposite sides of the slot snugly embrace the square portion 40. It is important that the hole 44 be exactly centered between the opposite sides of the slot 50 and that the mentioned sides of the slot flatly engage opposite sides of the square portion 40. From a practical standpoint the slot can be easily milled into the handle 10 in precise relationship to the hole 44. It is essential that the sides of the slot 50 engage the square portion 40 sufficiently snugly or tightly so that the element 14 is absolutely prevented from webbling or oscillating relative to the handle. In general I have found that a tolerance of .001 inches should be maintained between the width dimension of the slot and the width dimension of the square portion 40.

From the foregoing it will be readily apparent that the element 14 is axially adjustable within limits defined by the slot 50 merely by tightening or loosening the wing nut 46. As long as the square portion 40 is disposed within the slot 50, the element 14 is prevented from turning. Since the element 14 is held positively against angular movement relative to handle 10, it will hold the rearward end of the blade 18 angularly or rotatably fixed.

In addition to the above, the close fit between the square portion 40 and the slot 50 holds the element 14 exactly parallel at all times to the main body 24 of the frame 12. This relationship should exist for maximum efficiency in operation. Also, this arrangement permits the element 14 to be positioned in any one of four right-angular related positions on the handle, depending upon the position of the square portion 40 in the slot 50. By reason of the square shape of the portion 40, the element is held solidly in each of its four positions.

It is significant that the element 40 is positioned substantially above the bottom of the handle 10. By reason of this relationship, one or possibly two fingers of the hand are disposed below the element 14 when the handle 10 is gripped naturally in the hand. Consequently, in operation, force is transmitted substantially directly from the forearm of the user to the blade 18. This relationship makes the saw much easier to use and there is less likelihood of the blade 18 being broken.

The front element 16 also is generally in the form of an elongated, cylindrical pin having an essentially square head 52 at one end thereof. As clearly shown in the drawing, the cylindrical body portion of the element 16 extends diametrically through holes 54 provided in the terminal portion 28 with the head 52 at the outer side of the frame. In order to prevent the element 16 from rotating in the holes 54, a flat 56 is milled in the frame exactly centrally with respect to the outer opening 54. This flat 56 forms a seat for the head 52, and the two shoulders 58 formed at opposite sides of the flat embrace and snugly fit opposite sides of the head. In practice, I hold the dimension between shoulders 58 to within .001 inch larger than the width of head 52. If this tolerance is maintained, the head 52 will slip easily between the shoulders 58, and at the same time the element 16 is absolutely prevented from turning or wobbling in the frame. In connection with the above, however, it will be readily apparent that the element 16 can be positioned in any one of four right-angularly-related positions in the same manner as the element 14 and that it will be held fixedly against rotation in each of these positions by the shoulders 58.

Both of the elements 14 and 16 are formed at the inner ends thereof with flat, longitudinal surfaces which support and flatly engage the terminal portions of saw blade 18. The flat surface of element 14 is designated by the numeral 60, and the flat surface of element 16 is designated by the numeral 62. Preferably, surfaces 60 and 62 are offset beyond the axes of the elements 14 and 16 a distance equal to one half the thickness of saw blade 18 so that the center line of the blade coincides exactly with the center lines of the supporting elements. In this connection, it should be noted that the hole 44 which receives the element 14 and the openings 54 which receive the element 16 are exactly centred in the handle and frame respectively so that the center line of the saw blade 18 also coincides with the center of the frame 12. This arrangement provides a balanced condition and eliminates any tendency for the saw to wobble or to assume an incline position during a sawing operation.

Pins 64 and 66 are embedded in the elements 14 and 16 to project rearwardly at an angle from the surfaces 60 and 62 respectively. Preferably the pins 64 and 66 are disposed exactly midway between opposite longitudinal edges of the surfaces 60 and 62, and they preferably extend rearwardly at an angle of about 15° with respect to perpendiculars to the surfaces. As clearly shown in the drawing, the pins 64 and 66 extend through the terminal openings with which hack-saw blade 18 is conventionally provided. The inclined position of the pins prevents the blade 18 from inadvertently disengaging the mounting elements 14 and 16 when tension is imposed on the blade or as the result of lateral thrust imposed on the blade in use. In addition, the pin 66 preferably projects sufficiently from surface 62 as to prevent the fastening element 16 from falling out of the frame when the saw blade 18 is removed (Fig. 6). Thus, there are no parts that can become separated from the saw and lost or misplaced through inadvertence.

The manner in which the pins 64 and 66 are associated with the mounting elements 14 and 16 is a feature of this invention. Heretofore the holes which receive the mounting pins have been drilled at right angles to the surfaces which support the saw blade. The pins are press-fitted into the holes or sockets thus formed and are then bent rearwardly to the desired angle. This practice has been generally unsatisfactory since the bending operation elongates the adjacent outer portion of the socket, and the pins eventually work loose. This condition has been a constant source of trouble where this construction is employed.

I have overcome the condition referred to above by drilling holes 68 and 70 at the desired angle in the mounting elements 14 and 16 and then press-fitting the pins 64 and 66 therein. When this arrangement is used, the projecting portions of the pins are disposed at the proper angle and the bending operation heretofore used is eliminated. As a result, the entire bedded portions of the pins are solidly and uniformly gripped by the walls of their respective holes or sockets and the trouble heretofore occasioned by loosening of the pins is entirely eliminated.

It is a further feature of the invention that the terminal portion 26 of the frame 12 normally is disposed at an angle greater than 90° with respect to the main body portion 24. In practice, I have found that the terminal portion 26 should be bent through an angle of about 86° so that it lacks about 4° of being exactly at right angles with respect to the main body 24 of the frame 12. As hereinabove set forth, the mounting element 16 is exactly at right angles with respect to the terminal portion 26. Thus while the two mounting elements are generally in alignment, the element 14 is normally disposed exactly parallel to the main body of the frame whereas the mounting element 16 normally is disposed at an angle thereto as best shown in Fig. 7.

When the blade 18 is fastened to both of the pins 64 and 66 and the wing nut 46 is tightened, the blade is tensioned and the terminal portion 26 is flexed to a position substantially at right angles to the main body of the frame as shown in Fig. 1. It is important that the frame 12 has sufficient elasticity so that it will not be stretched beyond its elastic limit. Some flexing of the frame is bound to occur in any event, however, and it is imperative from a functional standpoint that the included angle between the body portion 24 and the terminal portion 26 be not less than 90° when maximum tension is imposed on the blade 18.

In this connection, I have found that the blade 18 must be held bowstring taut in use in order to prevent it from dulling quickly and breaking. If the blade is not held sufficiently taut, there is a tendency for a ripple to form therein immediately adjacent to the work which distorts the position of the teeth. If this occurs, the teeth quickly become dull and the blade breaks very easily. On the other hand, if the frame is constructed in such manner that the terminal portion thereof which supports the distal or forward end of the blade is flexed to a position less than 90° with respect to the main body of the frame when the blade is bowed taut, maximum efficiency in operation is not achieved. Tests have demonstrated the importance of constructing the frame so that the terminal portion is flexed to a position substantially at right angles to the main body of the frame when the blade is under maximum tension.

It may thus be seen that I have achieved the objects of my invention. I have provided a hack saw in which the frame is adjustable relative to the handle in order to accommodate various sizes of hack-saw blades, and the frame is associated with the handle in such manner that an absolutely rigid structure is produced when the blade is pulled taut in the frame. Also, I mount the blade in such manner that it is held absolutely rigid and prevented from twisting or oscillating in use. The wing nut 46 which is used to tauten or loosen the saw blade can be easily manipulated by grasping it between the thumb and fingers with the bottom of the handle against the palm of the hand. Also, the elements which mount the blade are angularly adjustable to four right-angularly-related positions and they are held equally firmly in all adjusted positions. I have found that the various features which embody the improved construction provide for maximum efficiency in use. Also, when the blade 18 is mounted and held in the manner hereinabove described, it remains sharp for a longer period of time and its life is increased severalfold.

It is to be understood that the form of the invention herewith shown and described is to be taken as a preferred example of the same and that various changes in the size, shape, and arrangement of parts may be resorted to without departing from the spirit of the invention or the scope of the appended claims.

Having thus described the invention I claim:

1. A hack saw having elongated, longitudinally spaced blade-supporting elements, a rigid handle member carrying one of said blade-supporting elements, a frame member having a main body portion carried by said handle and an inherently flexible terminal portion carrying the other of said blade-supporting elements, the inner terminal portions of said elements having flat, aligned surfaces adapted to seat against one side of a saw blade, pins projecting from said surfaces adapted to extend through the conventional mounting holes of the blade, said one blade-supporting element having an integral square portion and said handle being provided with an external milled slot forming a guideway which snugly but slidably receives said square portion, said other element having a substantially square head at the outer end thereof and the terminal portion of said frame being provided with an external milled slot extending entirely therethrough from one side to the other thereof, said slot defining a guideway which seats and snugly receives said head, the blade-supporting element carried by said handle being normally disposed parallel to the position of said saw blade on the saw, and the element carried by said frame being normally inclined downwardly away from the back of the saw and toward the handle thereof, and adjustable means for moving said blade-supporting elements longitudinally relative to each other, said blade-supporting elements and said frame being so constructed and arranged that the blade-supporting elements are brought substantially into alignment by flexure of the resilient terminal portion of said frame when the adjustable means is actuated to tauten a blade attached to such blade-supporting elements, and said flexible terminal portion being capable of flexing an amount necessary to bring said blade-supporting elements substantially into alignment without exceeding its elastic limit.

2. A hack saw having elongated, longitudinally spaced blade-supporting elements, a rigid handle member carrying one of said blade-supporting elements, a frame member having a main body portion carried by said handle and an inherently flexible terminal portion carrying the other of said blade-supporting elements, the inner terminal portions of said elements having flat, aligned surfaces adapted to seat against one side of a saw blade, pins projecting from said surfaces adapted to extend through the conventional mounting holes of the blade, said one blade-supporting element having an integral square portion and said handle being provided with a recess receiving said square portion, said recess having flat walls engaging opposite sides of said square portion to hold the latter against rotation, said other element also having a substantially square portion and the terminal portion of said frame being provided with a recess receiving the square portion of said element, said last-mentioned recess having flat walls engaging opposite sides of said square portion so as to hold said other element against rotation, the blade-supporting element carried by said handle being normally disposed parallel to the position of said saw blade on the saw, and the element carried by said frame being normally inclined downwardly away from the back of the saw and toward the handle thereof, and adjustable means for moving said blade-supporting elements longitudinally relative to each other, said blade-supporting elements and said frame being so constructed and arranged that the blade-supporting elements are brought substantially into alignment by flexure of the resilient terminal portion of said frame when the adjustable means is actuated to tauten a blade attached to such blade-supporting elements, and said flexible terminal portion being capable of flexing an amount necessary to bring said blade-supporting element substantially into alignment without exceeding its elastic limit.

HARVEY H. BOUSCHOR.

REFERENCES CITED

The following references are of record in the file of this patent:

UNITED STATES PATENTS

| Number | Name | Date |
|---|---|---|
| 739,457 | Tilden | Sept. 22, 1903 |
| 972,085 | Nacey | Oct. 4, 1910 |
| 1,595,035 | Troutman | Aug. 3, 1926 |
| 2,048,627 | Schmidt et al. | July 21, 1936 |
| 2,221,231 | Cassidy | Nov. 12, 1940 |
| 2,308,354 | Clemson | Jan. 12, 1943 |
| 2,332,545 | Acomb | Oct. 26, 1943 |

FOREIGN PATENTS

| Number | Country | Date |
|---|---|---|
| 140,006 | Great Britain | Mar. 18, 1920 |
| 531,403 | Great Britain | Jan. 3, 1941 |
| 594,228 | Great Britain | Nov. 6, 1947 |